(12) United States Patent
Watanabe et al.

(10) Patent No.: US 7,123,120 B2
(45) Date of Patent: Oct. 17, 2006

(54) SOLENOID

(75) Inventors: Koji Watanabe, Fujisawa (JP); Takuya Kudo, Fujisawa (JP); Shuji Fukunaga, Fujisawa (JP)

(73) Assignee: Nok Corporation, Tokyo (JP)

( * ) Notice: Subject to any disclaimer, the term of this patent is extended or adjusted under 35 U.S.C. 154(b) by 55 days.

(21) Appl. No.: 10/473,137

(22) PCT Filed: Dec. 26, 2002

(86) PCT No.: PCT/JP02/13672

§ 371 (c)(1),
(2), (4) Date: Oct. 7, 2003

(87) PCT Pub. No.: WO03/056579

PCT Pub. Date: Jul. 10, 2003

(65) Prior Publication Data

US 2004/0113730 A1 Jun. 17, 2004

(30) Foreign Application Priority Data

Dec. 27, 2001 (JP) .............................. 2001-396054
May 14, 2002 (JP) .............................. 2002-138128

(51) Int. Cl.
*H01F 7/08* (2006.01)

(52) U.S. Cl. ...................................................... 335/220
(58) Field of Classification Search ......... 335/220–234
See application file for complete search history.

(56) References Cited

U.S. PATENT DOCUMENTS

| 3,787,791 | A | * | 1/1974 | Borger et al. ............... 335/274 |
| 5,727,591 | A | * | 3/1998 | Doll ........................... 137/554 |
| 6,530,718 | B1 | * | 3/2003 | Nygren et al. ............. 403/337 |
| 6,667,677 | B1 | * | 12/2003 | Yajima et al. ............. 335/220 |

FOREIGN PATENT DOCUMENTS

JP        62-96807       6/1987

* cited by examiner

*Primary Examiner*—Elvin Enad
*Assistant Examiner*—Bernard Rojas
(74) *Attorney, Agent, or Firm*—Jacobson Holman PLLC

(57) ABSTRACT

Provided is a solenoid which is easier to assemble and which is improved in terms of operability. The solenoid is provided with a snap ring 22 which helps to integrate the molded coil 2 and the solenoid main body 3 into one, whereby it is possible to finally integrate the molded coil 2 and the solenoid main body 3 with each other after various operation processes; by finally attaching the molded coil 2, the lead wire 9 extending from the molded coil 2 constitutes no obstacle, and the assembly is facilitated, thus achieving an improvement in terms of operability.

2 Claims, 13 Drawing Sheets

SOLENOID

This is a nationalization of PCT/JP02/13672 filed Dec. 26, 2002 and published in Japanese.

TECHNICAL FIELD

The present invention relates to a solenoid for use in solenoid valves or the like for various types of hydraulic/pneumatic control apparatuses such as a shock absorber.

BACKGROUND ART

FIG. 13 shows an example of a conventional solenoid of this type. FIG. 13 is a schematic sectional view of a conventional solenoid.

A solenoid 101 is formed by combining a molded coil 102 and a solenoid main body 103 with each other into an integral unit.

The molded coil 102 includes a coil 104 wound around thereon, and, at the center of the coil 104, there is formed a hole 105 recessed facing the solenoid main body 103.

Further, in the portion of the molded coil 102 on the side opposite to the solenoid main body 103, there is provided an annular plate 106 which is adjacent to the coil 104, and, from the plate 106 onward, there is provided a mold portion 107 forming the bottom surface of the hole 105. In the mold portion 107, a coil wire 108 led out of the coil 104 is connected to a lead wire 109.

The solenoid main body 103 is equipped with a column portion 110 which constitutes a core portion thereof and which is to be inserted into the hole 105 of the molded coil 102, and a case 111 spaced apart from the column portion 110 through the intermediation of the annular space in which the molded coil 102 is arranged and covering the outer periphery of the molded coil 102.

The column portion 110 of the solenoid main body 103 is equipped with center post 112 formed integrally with the case 111, a plunger 113 magnetically attracted to the center post 112 through energization of the coil 104, a rod 114 connected to the plunger 113, a bearing 115 supporting the rod 114, a cap 116 covering the forward end portion of the column portion 110, and a guide 117 smoothening the outer periphery between the cap 116 and the center post 112 to facilitate the insertion of the column portion 110 into the hole 105 of the molded coil 102.

A shim 118 is arranged on the inner side of the center post 112.

The center post 112 extends from the inner end of an annular radial portion 119 toward the molded coil 102. Further, the case 111 also extends from the outer end of the annular radial portion 119 toward the molded coil 102.

And, caulking fixation is effected on the end portion of the case 111 and the corner portion of the molded coil 102, whereby the molded coil 102 and the solenoid main body 103 are integrated with each other.

In the solenoid 101, constructed as described above, by supplying electric current to the coil 104 through the lead wire 109, a magnetic circuit is formed, where a current passes through: the center post 112, the case 111, the plate 106, and the plunger 113, and back to 112. The plunger 113 is magnetically attracted to the center post 112.

When no electric current is being supplied to the coil 104, the plunger 113 is spaced apart from the center post 112 as shown in the drawing under the urging force of a spring or the like (not shown).

However, in this conventional solenoid 101, in which the molded coil 102 and the solenoid main body 103 are integrated with each other by caulking fixation, the presence of the lead wire 109 constitutes an obstacle when the solenoid 101 is mounted to an associated hydraulic/pneumatic control apparatus, resulting in a rather poor mounting operability.

Further, in the assembly line for assembling the hydraulic/pneumatic control apparatus concerned, the presence of the lead wire 109 constitutes an obstacle even in the process after the mounting of the solenoid 101 to the hydraulic/pneumatic control process, resulting in a rather poor operability.

Further, when the solenoid 101, composed of the molded coil 102 and the solenoid main body 103 integrated with each other through caulking fixation, is mounted to the associated hydraulic/pneumatic control apparatus by welding, heat load is applied to the molded coil 102, which entails the need for special consideration during operation. Otherwise, welding cannot be selected as the mounting method.

And, in an apparatus involving coating as in the case of a shock absorber, coating is first performed separately on the apparatus and the case 111 of the solenoid main body 103, and then the molded coil 102 and the solenoid main body 103 are integrated into one through caulking fixation. Thereafter, the solenoid 101, formed into an integral unit, is mounted to the apparatus, which means coating has to be performed separately on the apparatus and the case 111, resulting in a rather poor operability.

DISCLOSURE OF THE INVENTION

The present invention has been made with a view toward solving the above problems in the conventional art. It is an object of the present invention to provide a solenoid which is easier to assemble and which is improved in terms of operability.

To achieve the above object, there is provided, in accordance with the present invention, a solenoid in which it is possible to mount solely the solenoid main body to the associated hydraulic/pneumatic control apparatus prior to the integration of the molded coil and the solenoid main body into a unit, in which, after the mounting of the solenoid main body, the molded coil and the solenoid main body are finally integrated with each other after various operation processes before being mounted to the hydraulic/pneumatic control apparatus.

Thus, the lead wire extending from the molded coil does not constitute any obstacle to the assembly operation. Further, it is possible to perform the welding of the solenoid main body to the hydraulic/pneumatic control apparatus beforehand, so that no heat load is applied to the molded coil. Further, in an apparatus involving coating as in the case of a shock absorber, it is possible to mount the solenoid main body to the apparatus beforehand, and then to perform coating collectively on the apparatus and the case of the solenoid main body.

Therefore, according to the present invention, there is provided a solenoid including:

a molded coil composed of a coil of a plural number of turns and having a hole at its center; and a solenoid main body having a case covering the outer periphery of the molded coil, a movable plunger inserted into the hole at the center of the molded coil, and a center post arranged in a direction in which the plunger is moved and attracted by a magnetic force generated by the coil, characterized in that a snap ring is provided for integrating the molded coil and the solenoid main body into one.

It is preferable that the snap ring is mounted between a step portion in the outer periphery of the molded coil and a groove formed in the inner peripheral surface of the case.

It is preferable that the snap ring is mounted between a groove formed in the outer peripheral surface of the molded coil and a groove formed in the inner peripheral surface of the case.

It is preferable that the outer diameter of the molded coil as measured at least on the outer side of the position where the snap ring is mounted is substantially the same as the inner diameter of the case.

It is preferable that a peripheral section of the bottom of a groove formed in the outer peripheral surface of the molded coil and around which the snap ring is wrapped is noncircular.

It is preferable that a wall portion is provided which protrudes from the bottom of the groove formed in the outer peripheral surface of the molded coil and around which the snap ring is wrapped and which constitutes a stopping between the end portions of the snap ring.

It is preferable that a protrusion is provided which is spaced apart from the bottom of the groove formed in the outer peripheral surface of the molded coil and around which the snap ring is wrapped and which is situated on the outer side of the portion between the end portions of the snap ring.

According to the present invention, there is provided a solenoid including:

a molded coil composed of a coil of a plural number of turns and having a hole at its center; and a solenoid main body having a case covering the outer periphery of the molded coil, a movable plunger inserted into the hole at the center of the molded coil, and a center post arranged in a direction in which the plunger is moved and attracted by a magnetic force generated by the coil, characterized in that an engagement portion is provided for engaging the molded coil and the case with each other so as to integrate the molded coil and the solenoid main body into one.

It is preferable that the engagement portion is composed of a recess provided in one of the molded coil and the case and a protrusion locked the recess and provided on the other of the molded coil and the case.

In accordance with the present invention, there is provided a snap ring which helps to integrate the molded coil and the solenoid main body into one, whereby it is possible to finally integrate the molded coil and the solenoid main body with each other after various operation processes; by finally attaching the molded coil, the lead wire extending from the molded coil constitutes no obstacle, and the assembly is facilitated, thus achieving an improvement in terms of operability.

By mounting the snap ring between the step portion in the outer periphery of the molded coil and the groove formed in the inner peripheral surface of the case, it is possible to first fit the snap ring into the groove formed in the inner peripheral surface of the case, and then put the molded coil in the case for integration, thereby facilitating the assembly and achieving an improvement in the assembling performance.

By mounting the snap ring between the groove formed in the outer peripheral surface of the molded coil and the groove formed in the inner peripheral surface of the case, it is possible to first fit the snap ring into the groove formed in the outer peripheral surface of the molded coil, and then put the molded coil with the snap ring fitted therein in the case for integration, thereby facilitating the assembly and achieving an improvement in the assembling performance.

Since the outer diameter of the molded coil as measured at least on the outer side of the position where the snap ring is mounted is substantially the same as the inner diameter of the case, there is no gap between the molded coil and the case outside the position where the snap ring is mounted, and the snap ring is invisible from outside, so that the user cannot touch the snap ring, thereby achieving an improvement in terms of safety.

The peripheral section of the bottom of the groove formed in the outer peripheral surface of the molded coil, around which the snap ring is wrapped, is noncircular, which allows centering of the snap ring and makes it possible to make the outer diameter of the portion where the coil and the lead wire are connected through the coil wire relatively large in order to secure the requisite wall thickness for the corresponding portion of the mold portion. Further, in the noncircular outer periphery in conformity with the configuration of the snap ring, no great insertion load is applied to the solenoid main body of the molded coil around which the snap ring is wrapped, thus achieving an improvement in the mounting performance.

Further, after the completion of the assembly, the molded coil is not allowed to rotate freely, so that it is possible to prevent stress from being applied to the lead wire. Thus, there is no fear of the lead wire being pulled, twisted, etc. as a result of rotation of the molded coil, thus stabilizing the attitude of the molded coil.

Due to the provision of the wall portion protruding from the bottom of the groove formed in the outer peripheral surface of the molded coil around which the snap ring is wrapped and constituting a stopping between the end portions of the snap ring, it is possible to prevent the snap ring from being rotated since either end portion of the snap ring abuts the wall portion, so that it is possible to prevent the snap ring from being displaced from the proper position to thereby constitute such an obstruction as would make it impossible to put the molded coil in the case.

Due to the provision of the protrusion spaced apart from the bottom of the groove which is formed in the outer peripheral surface of the molded coil and around which the snap ring is wrapped, and situated on the outer side of the portion between the end portions of the snap ring, it is possible to prevent the snap ring from rotating since either end portion of the snap ring abuts the protrusion. Further, even when either end portion of the snap ring abuts the protrusion, the snap ring can be contracted from both sides, so that no increase in the requisite force for contracting the snap ring is involved.

Due to the provision of the engagement portion for engagement of the molded coil and the case with each other so as to integrate the molded coil and the solenoid main body into one, the molded coil and the solenoid main body can be easily integrated finally after various operation processes; by finally attaching the molded coil, the lead wire constitutes no obstacle upon the assembly, thus simplifying the assembly and achieving an improvement in the assembling performance.

The engagement portion is composed of a recess provided in one of the molded coil and the case and a protrusion locked the recess and provided on the other of these components, whereby it is possible to realize an integrated unit composed of the molded coil and the solenoid main body in a simple construction.

BEST MODE FOR CARRYING OUT THE INVENTION

Preferred embodiments of this invention will now be described in detail with reference to the drawings. Note that the dimensions, materials, configurations, and positional relationship of the components of these embodiments as given below should not be construed restrictively unless otherwise specified.

(First Embodiment)

Figure 1:
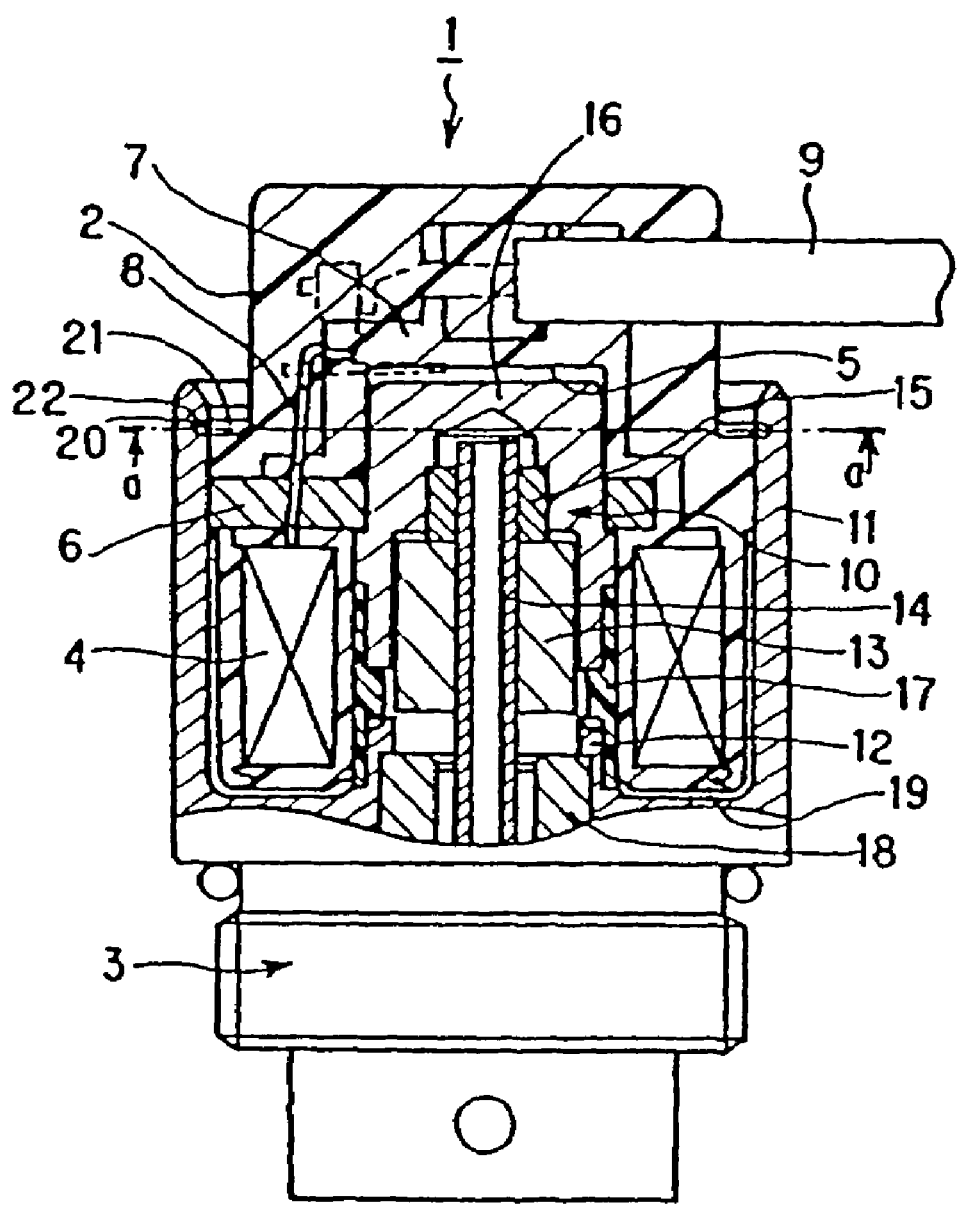
FIG. 1 is a schematic sectional view of a solenoid according to a first embodiment.
Figure 2:
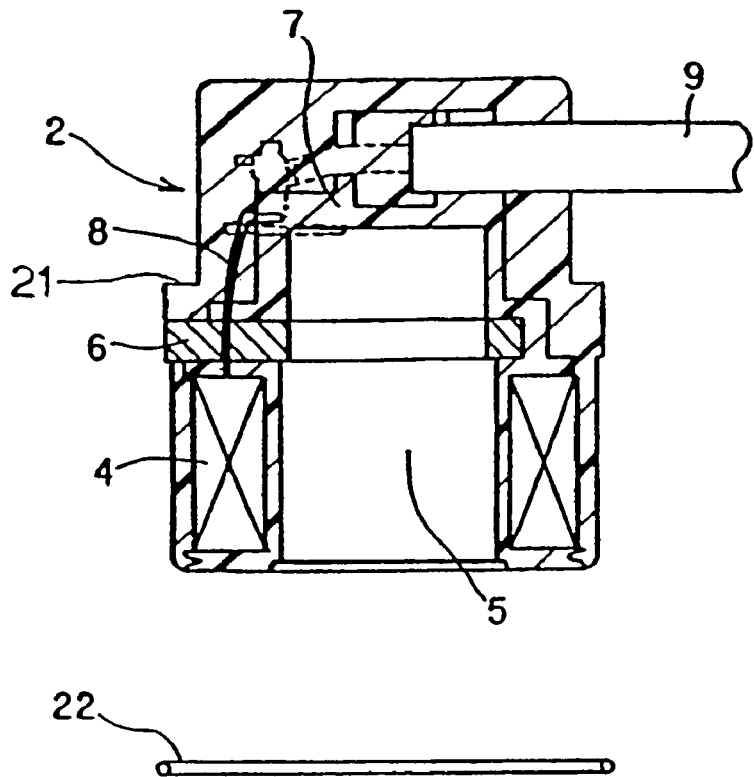
FIG. 2 is a schematic sectional view of the components of the solenoid of the first embodiment.
Figure 2:
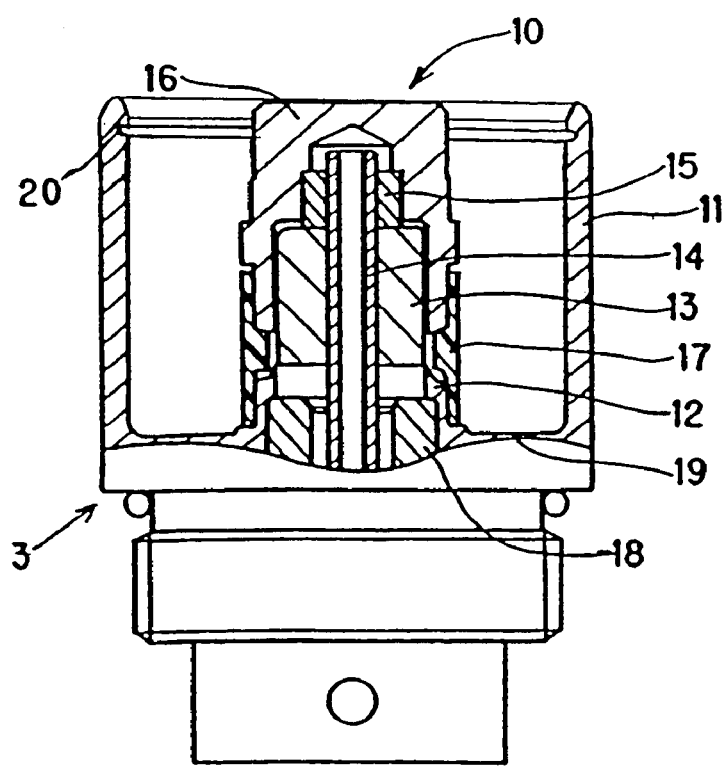
Figure 3:
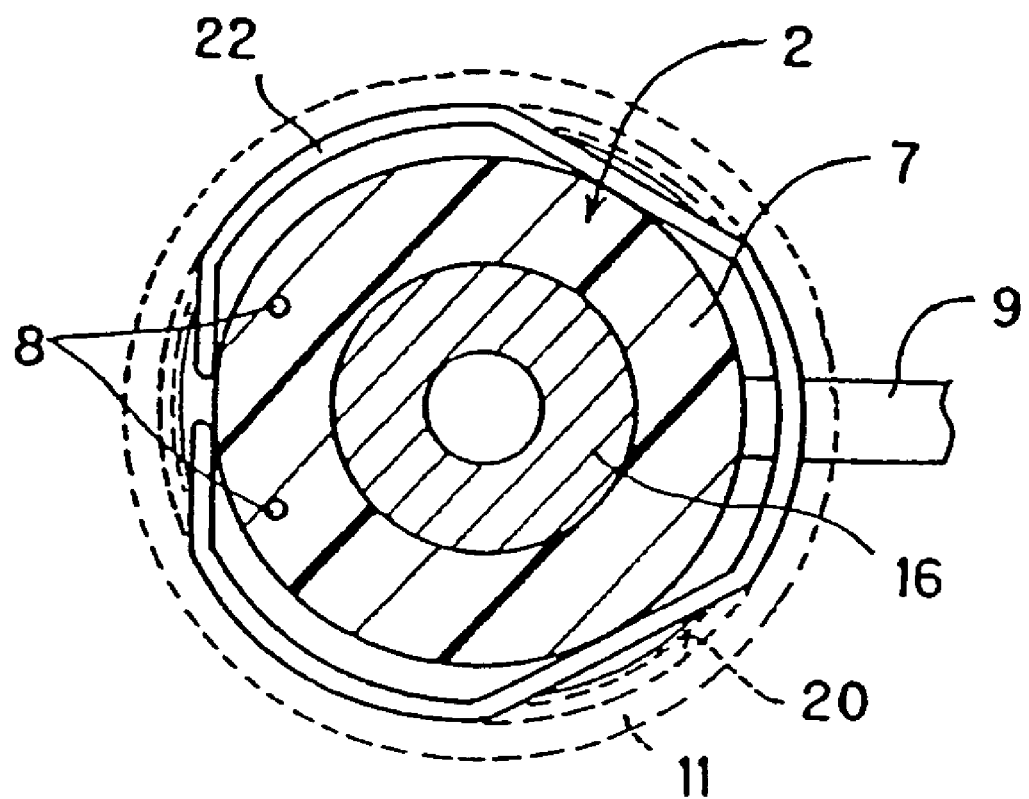
FIG. 3 is a schematic sectional view taken along the line a—a of FIG. 1.

A solenoid according to a first embodiment of the present invention will be described with reference to FIGS. 1 through 3. FIG. 1 is a schematic sectional view of the solenoid of the first embodiment. FIG. 2 is a schematic sectional view of the components of the solenoid of the first embodiment. FIG. 3 is a schematic sectional view taken along the line a—a of FIG. 1.

A solenoid 1 is formed by integrating a molded coil 2 and a solenoid main body 3 with each other.

The molded coil 2 includes a wound-up coil 4, at the center of which there is formed a hole 5 facing the solenoid main body 3.

Further, in a portion of the molded coil 2 on the side opposite to the solenoid main body 3, there is provided an annular plate 6 adjacent to the coil 4. From the plate 6 onward, there is provided a mold portion 7 forming a bottom surface of the hole 5. In the mold portion 7, a coil wire 8 led out of the coil 4 is connected to a lead wire 9.

The solenoid main body 3 is equipped with a column portion 10 which is situated at the axial center thereof and which is to be inserted into the hole 5 of the molded coil 2 and a case 11 spaced apart from the column portion 10 through the intermediation of an annular space, in which the molded coil 2 is arranged, and covering the outer periphery of the molded coil 2.

The column portion 10 of the solenoid main body 3 is equipped with a center post 12 formed integrally with the case 11, a plunger 13 magnetically attracted to the center post 12 through energization of the coil 4, a rod 14 connected to the plunger 13, a bearing 15 supporting the rod 14, a cap 16 covering the forward end portion of the column portion 10, and a guide 17 smoothening the outer periphery between the cap 16 and the center post 12 to facilitate the insertion of the column portion 10 into the hole 5 of the molded coil 2.

A shim 18 is arranged on the inner side of the center post 12.

The center post 12 extends toward the molded coil 2 side from the inner end of an annular radial portion 19. Further, the case 11 also extends toward the molded coil 2 side from the outer end of the annular radial portion 19.

Then, a snap ring 22 is mounted between a groove 20 formed in the inner peripheral surface of the case 11 and a step portion 21 formed in the outer periphery of the molded coil 2. By thus mounting the snap ring 22, the molded coil 2 and the solenoid main body 3 are integrated into one.

As shown in FIG. 3, which is a sectional view taken along the line a—a of FIG. 1, in the solenoid 1 of this embodiment, the peripheral section of the bottom of the groove around which the snap ring 22 is wrapped is circular.

In the solenoid 1 constructed as described above, by supplying an electric current to the coil 4 through the lead wire 9, a magnetic circuit is formed by the center post 12, the case 11, the plate 6, and the plunger 13, with the plunger 13 being magnetically attracted to the center post 12.

When no electric current is being supplied to the coil 4, the plunger 13 is spaced apart from the center post 12 as shown in the drawing under the urging force of a spring or the like (not shown).

In this solenoid 1, in the state in which, as shown in FIG. 2, the molded coil 2, the solenoid main body 3, and the snap ring 22 are separated from each other, the molded coil 2 is first put in the case 11. Then, thereafter, the snap ring 22 is fitted into the groove 20 formed in the inner peripheral surface of the case 11, and the snap ring 22 is hooked onto the step portion in the outer periphery of the molded coil 2 to thereby mount the snap ring, whereby the molded coil 2 and the solenoid main body 3 can be integrated into one, thus facilitating the assembly and achieving an improvement in the assembling performance.

Further, in this embodiment, around the portions of the molded coil 2 and the case 11 where the snap ring 22 is fitted, there is a difference between the outer diameter of the molded coil 2 and the inner diameter of the case 11.

Thus, in the portions of the molded coil 2 and the case 11 where the snap ring 22 is fitted, there is a gap between the molded coil 2 and the case 11, and the snap ring 22 is visible from outside, so that it is possible to touch the snap ring 22 and remove it easily, thereby achieving an improvement in terms of maintainability.

(Second Embodiment)

Figure 4:
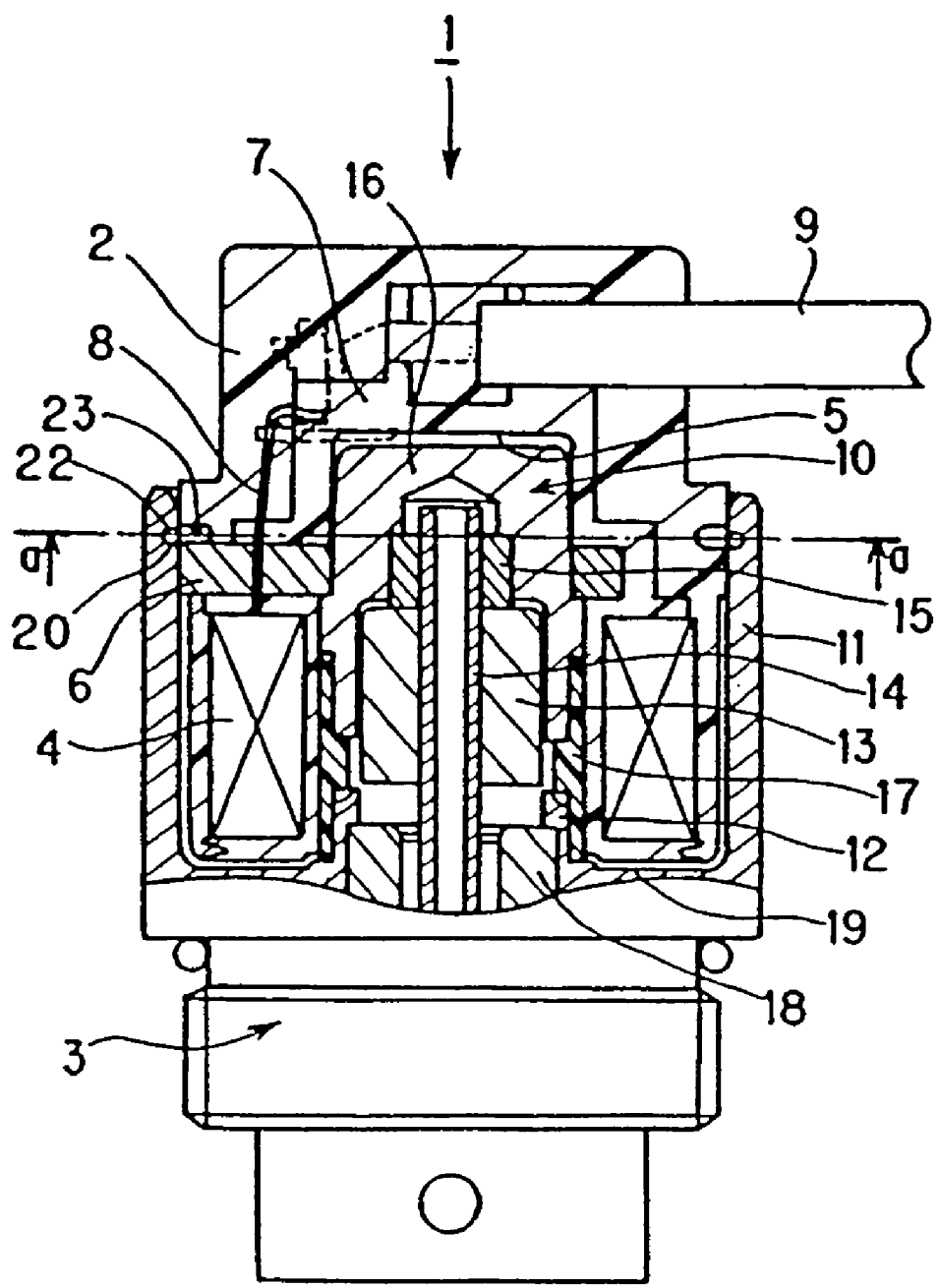
FIG. 4 is a schematic sectional view of a solenoid according to a second embodiment.
Figure 5:
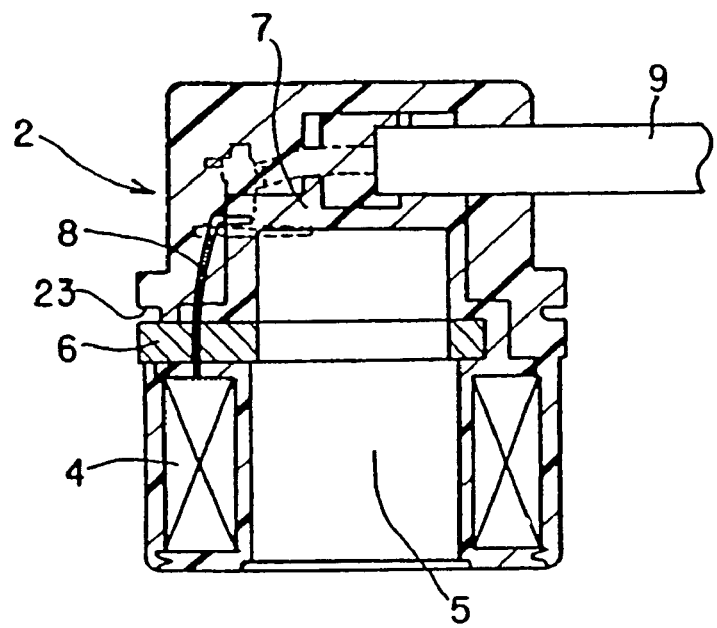
FIG. 5 is a schematic sectional view of the components of the solenoid of the second embodiment.
Figure 5:
Figure 5:
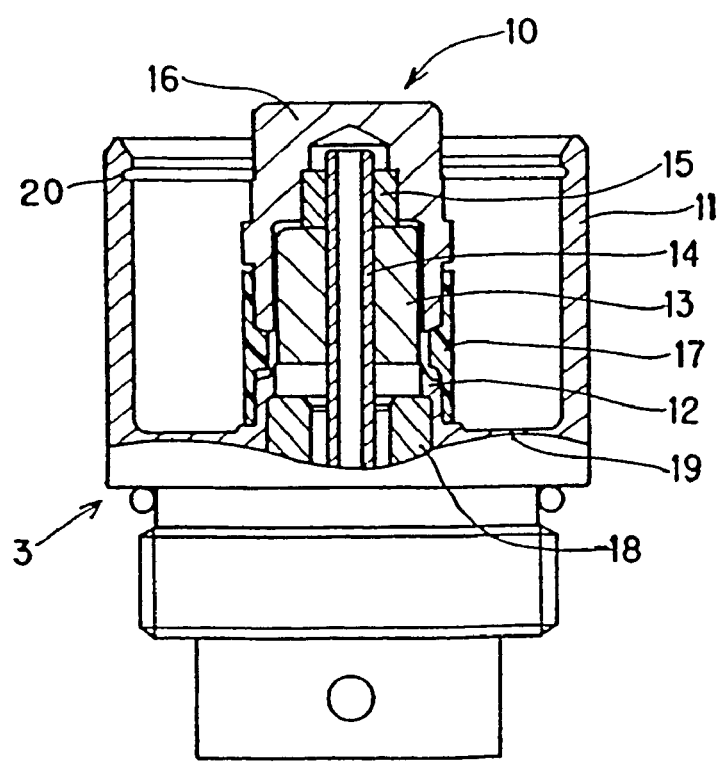

A solenoid according to a second embodiment of the present invention will be described with reference to FIGS. 4 and 5. FIG. 4 is a schematic sectional view of the solenoid of the second embodiment. FIG. 5 is a schematic sectional view of the components of the solenoid of the second embodiment. The components which are the same as those of the above-described embodiment are indicated by the same reference numerals, and a description of such components will be omitted.

In the solenoid 1 of this embodiment, the snap ring 22 is mounted between the groove 20 formed in the inner peripheral surface of the case 11 and a groove 23 formed in the outer periphery of the molded coil 2. Due to the mounting of this snap ring 22, the molded coil 2 and the solenoid main body 3 are integrated into one.

As shown in FIG. 3, which is a sectional view taken along the line a—a of FIG. 4, as in the case of the first embodiment, in the solenoid 1 of this embodiment, the peripheral section of the bottom of the groove 23 of the molded coil 2, around which the snap ring 22 is wrapped, is circular.

In this solenoid 1, in the state in which the molded coil 2, the solenoid main body 3, and the snap ring 22 are separated from each other as shown in FIG. 5, the snap ring 22 is first fitted into the groove 23 formed in the outer peripheral surface of the molded coil 2. Then, thereafter, the molded coil 2 is put in the case 11, and the snap ring 22 is also fitted into the groove 20 formed in the inner peripheral surface of the case 11 to thereby mount the snap ring 22, whereby it is possible to integrate the molded coil 2 and the solenoid main body 3 into one, thereby facilitating the assembly and achieving an improvement in the assembling performance.

Further, in this embodiment, around the portions of the molded coil 2 and the case 11 where the grooves 23 and 20, into which the snap ring 22 is to be fitted, are formed, the outer diameter of the molded coil 2 and the inner diameter of the case 11 are substantially the same.

Thus, in the portions of the molded coil 2 and the case 11 where the grooves 23 and 20, into which the snap ring 22 is to be fitted, are not formed, there is no gap between the molded coil 2 and the case 11, and the snap ring 22 is not visible from outside, so that the user cannot touch the snap ring 22, thereby achieving an improvement in terms of safety.

When the portion where there is no gap between the molded coil 2 and the case 11, that is, the portion where the outer diameter of the molded coil 2 and the inner diameter of the case 11 are substantially the same, is formed at least on the outer side of the position where the snap ring 22 is mounted, the snap ring 22 is not visible from outside, thus making it possible to achieve the above objective.

Further, an improvement in terms of assembling performance can be achieved even if the portion where the outer diameter of the molded coil 2 and the inner diameter of the case 11 are substantially the same is not formed at least on the outer side of the portion where the snap ring 22 is mounted.

(Third Embodiment)

Figure 6:
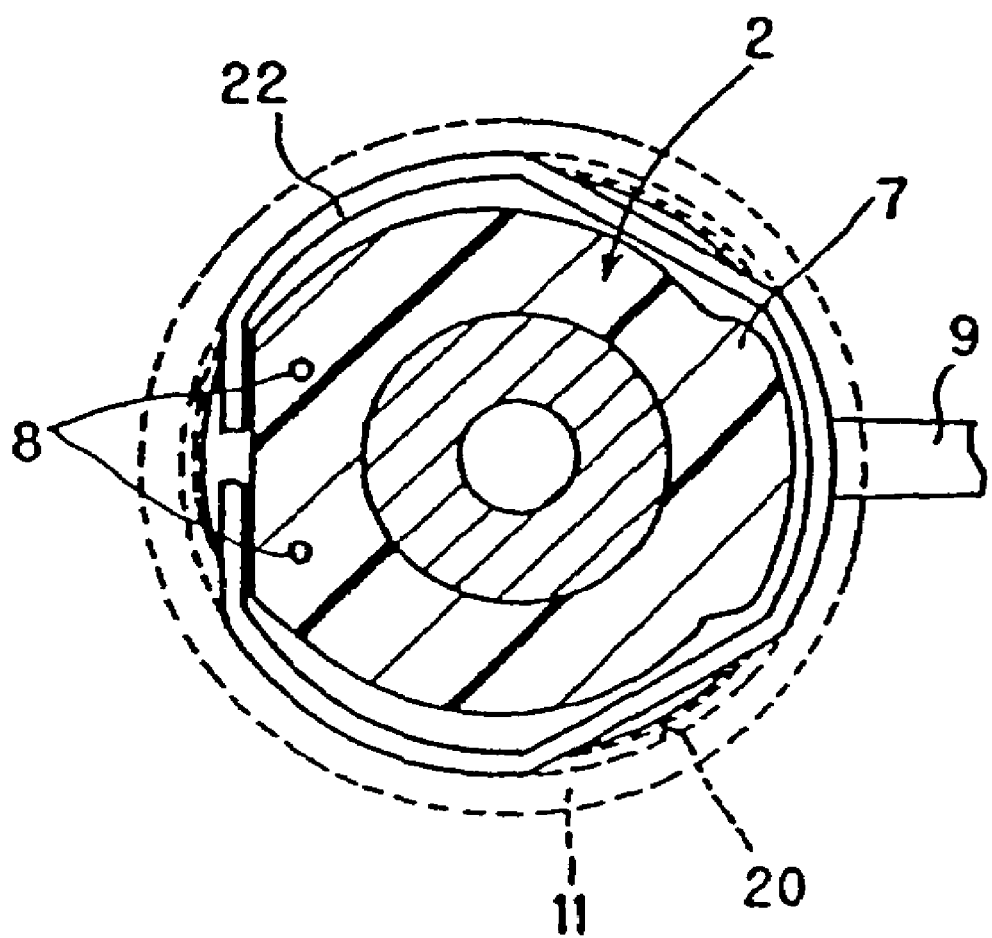
FIG. 6 is a schematic sectional view taken along the line a—a of FIG. 4.

A solenoid according to a third embodiment of the present invention will be described with reference to FIG. 6. FIG. 6 is a schematic sectional view similar to FIG. 3, which is taken along the line a—a of FIG. 4. The components which are the same as those of the above-described embodiments are indicated by the same reference numerals, and a description of such components will be omitted.

In the second embodiment, to allow centering of the snap ring 22, it is necessary for the outer diameter of the groove 23 of the molded coil 2 to be large to some degree. However, making the outer diameter large results in an increase in the insertion load for the molded coil 2 with the snap ring 22 attached thereto, which entails a problem regarding the assembling performance. On the other hand, making the outer diameter small in order to reduce the insertion load entails a problem regarding the centering of the snap ring 22 and difficulty in securing the requisite wall thickness of the portion of the mold portion 7 where the coil 4 and the lead wire 9 are connected through the coil wire 8.

Thus, it has been rather difficult to appropriately set the outer diameter of the periphery of the bottom of the groove 23 of the molded coil 2 around which the snap ring 22 is wrapped.

Further, when the peripheral section of the bottom of the groove 23 of the molded coil 2 around which the snap ring 22 is wrapped is circular as shown in FIG. 3, the molded coil 2 is allowed to freely rotate after the completion of the solenoid; rotation of the molded coil 2 causes the lead wire 9 to be pulled, twisted, etc., resulting in stress being applied to the lead wire 9.

In view of this, in the solenoid 1 of this embodiment, as shown in FIG. 6, which is a sectional view taken along the line a—a of FIG. 4, the peripheral section of the bottom of the groove 23 of the molded coil 2 around which the snap ring 22 is wrapped is noncircular.

More specifically, as shown in FIG. 6, the noncircular configuration of the peripheral section of the bottom of the groove 23 of the molded coil 2 is as follows provided that the contraction of the snapping 22 is not hindered: in conformity with the snap ring 22 fitted into the groove 20 of the case 11 which is equally divided into three portions, the groove 23 exhibits a relatively large diameter in the portions thereof where the snap ring 22 is fitted into the groove 20 of the case 11, and a relatively small diameter in the other portions thereof; in applying a force to the end portions of the snap ring 22, reducing (enlarging) the diameter of the snap ring 22 results in a reduction (an increase) in the size of the portion of the snap ring 22 around the end portions thereof; the farther away from the end portions of the snap ring 22, the less the deformation thereof, thus providing a configuration in conformity with the permissible deformation of the snap ring 22.

Thus, to allow centering of the snap ring 22 and to secure the requisite wall thickness for the portion of the mold portion 7 where the coil 4 and the lead wire 9 are connected through the coil wire 8, it is possible for the outer diameter of the corresponding portion to be made large to some degree, and, in the case of the noncircular outer periphery in conformity with the configuration of the snap ring 22, no increase in insertion load is involved for the molded coil 2 with the snap ring 22 attached thereto, thus improving the assembling performance. It has been experimentally ascertained that the insertion load is 294N in the case of the circular peripheral section of the bottom of the groove of the conventional solenoid, whereas it reduces to 49N in the case of the noncircular peripheral section of this embodiment.

Further, after the completion of the solenoid, the molded coil 2 is not allowed to freely rotate, so that there is no fear of the lead wire 9 being pulled, twisted, etc. as a result of rotation of the molded coil 2, whereby it is possible to prevent stress from being applied to the lead wire 9, thereby stabilizing the attitude of the molded coil 2.

(Fourth Embodiment)

A solenoid according to a fourth embodiment of the present invention will be described with reference to FIG. 7. FIG. 7 is a schematic sectional view similar to FIG. 6, which is taken along the line a—a of FIG. 4. The components which are the same as those of the above-described embodiments are indicated by the same reference numerals, and a description of such components will be omitted.

In the third embodiment, the peripheral section of the bottom of the groove 23 of the molded coil 2 around which the snap ring 22 is wrapped is noncircular. However, when the snap ring 22 attached to the molded coil 2 is allowed to rotate before the latter is put in the case 11, the snap ring 22 is displaced from the proper position to thereby constitute an obstacle, making it impossible to put the molded coil 2 in the case 11.

In view of this, in the solenoid 1 of this embodiment, as shown in FIG. 7, which is a sectional view taken along the line a—a of FIG. 4, there is provided a wall portion 7a protruding from the bottom of the groove 23 of the molded coil 2 around which the snap ring 22 is wrapped and constituting a stopping between the end portions of the snap ring 22.

The wall portion 7a is provided on the mold portion 7 and constitutes a stopping between the end portions of the snap ring 22 to serve as a detent for preventing the snap ring 22 from rotating around the groove 23 of the molded coil 2.

Figure 7A:
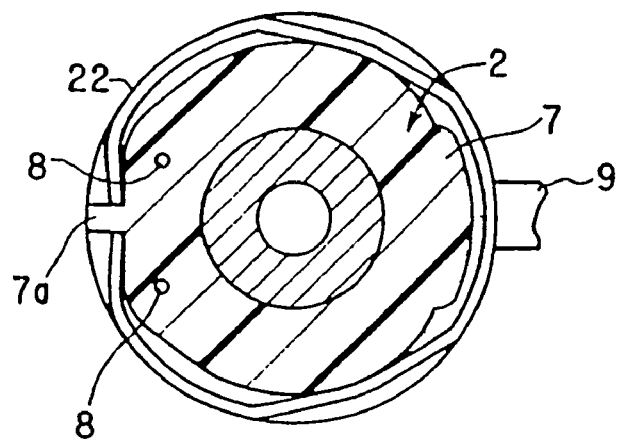
FIGS. 7 are schematic sectional views taken along the line a—a of FIG. 4.
Figure 7B:
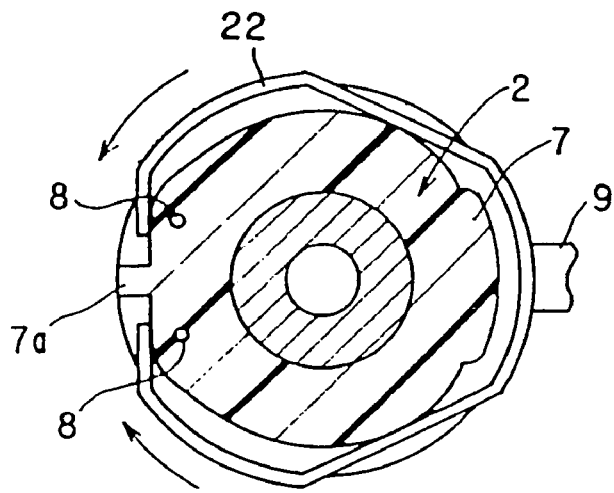

In the state shown in FIG. 7A, the portion of the snap ring 22 around the end portions thereof is contracted so as to allow fitting into the case 11. The deformation into the state shown in FIG. 7A from the state shown in FIG. 7B is effected by contracting the portions of the snap ring 22 around its end portions as indicated by the arrows.

Due to this construction, either end portion of the snap ring 22 abuts the wall portion 7a to prevent the snap ring 22 from rotating, making it possible to prevent the snap ring 22 from being displaced from the proper position to thereby constitute such an obstacle as would make it impossible to put the molded coil 2 in the case 11.

(Fifth Embodiment)

A solenoid according to a fifth embodiment of the present invention will be described with reference to FIG. 8. FIG. 8 is a schematic sectional view similar to FIG. 7, which is taken along the line a—a of FIG. 4. The components which are the same as those of the above-described embodiments are indicated by the same reference numerals, and a description of such components will be omitted.

Figure 7C:
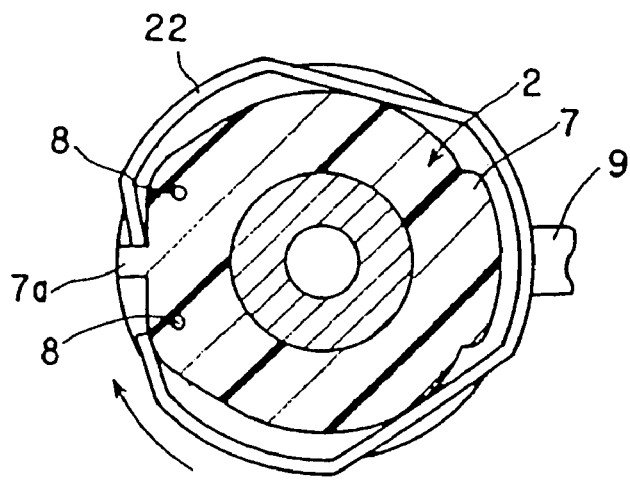

In the fourth embodiment, there is provided the wall portion 7a protruding from the bottom of the groove 23 of the molded coil 2 around which the snap ring 22 is wrapped and constituting a stopping between the end portions of the snap ring 22. However, an attempt to contract the portion of the snap ring 22 around the end portions thereof in a state in which one end portion of the snap ring is in contact with the wall portion 7a as shown in FIG. 7C, results in the contraction being effected solely from the side of the other end portion which is out of contact with the wall portion 7a, which leads to the need for a force of a corresponding magnitude. Further, the snap ring 22 has to be set shorter by the thickness of the wall portion 7a, with the result that the snap ring 22 is liable to rotate.

In view of this, as shown in FIG. 8, which is a sectional view taken along the line a—a of FIG. 4, in the solenoid 1 of this embodiment, there is provided a protrusion 7b spaced apart from the bottom of the groove 23 of the molded coil 2 around which the snap ring 22 is wrapped and situated on the outer side of the portion between the end portions of the snap ring 22.

The protrusion 7b is provided on the mold portion 7 and situated in the outer periphery and between the end portions of the snap ring 22 and serves as a detent for preventing the snap ring 22 from rotating around the molded coil 2.

Figure 8A:
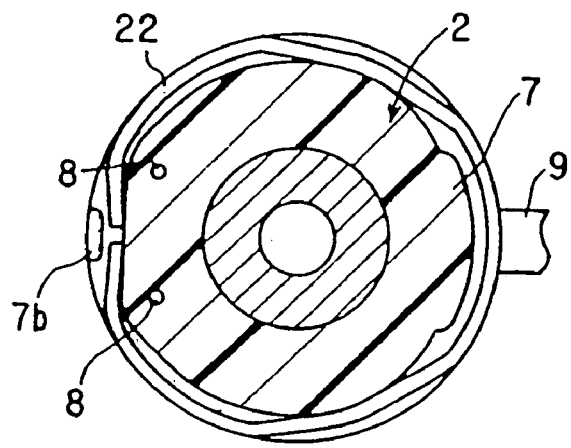
FIGS. 8 are schematic sectional views taken along the line a—a of FIG. 4.
Figure 8B:
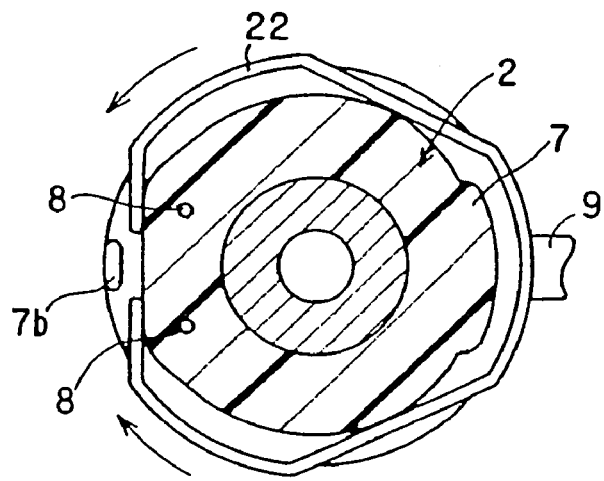

In the state shown in FIG. 8A, the portion of the snap ring 22 around the end portions thereof is contracted so as to allow fitting into the case 11. The deformation into the state shown in FIG. 8A from the state shown in FIG. 8B is effected by contracting the portion of the snap ring 22 around its end portions as indicated by the arrows.

Figure 8C:
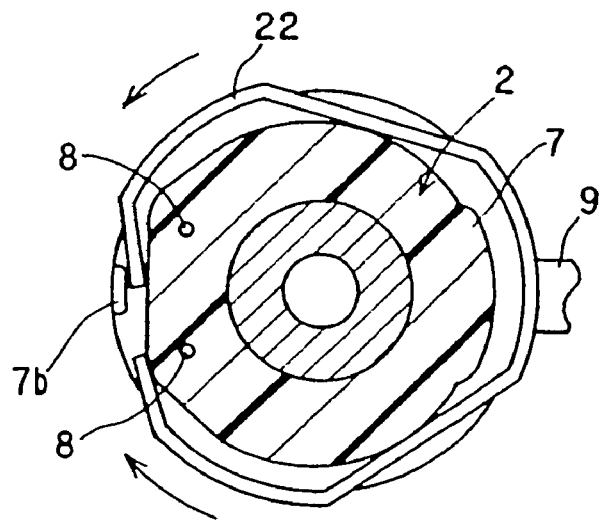

Also in the case in which the portion of the snap ring 22 around the end portions thereof is to be contracted in the state in which one end portion thereof is in contact with the protrusion 7b as shown in FIG. 8C, it is possible to contract the portion of the snap ring 22 around its end portions as indicated by the arrows. As compared with the case in which one end of the snap ring 22 abuts the wall portion 7a as shown in FIG. 7, the requisite force is smaller.

Thus, it is possible to contract the portion of the snap ring 22 around its end portions with a small force and attach the case 11 smoothly. Further, after the attachment of the case 11, rotation of the snap ring 22 relative to the molded coil 2 can be reliably prevented.

Furthermore, like the case in which an end portion of the snap ring 22 abuts the wall portion 7a, there is no fear of a sharp-edged portion of the end portion of the snap ring 22 cutting into the wall portion 7a to thereby hinder smooth contraction of the snap ring 22.

Due to the above arrangement, an end portion of the snap ring 22 abuts the protrusion 7b to thereby prevent rotation of the snap ring 22, and, even when an end portion of the snap ring 22 abuts the protrusion 7b, it is possible for the snap ring 22 tope contracted from both sides, so that no increase in the requisite force for the contraction of the snap ring 22 is involved.

(Sixth Embodiment)

Figure 9:
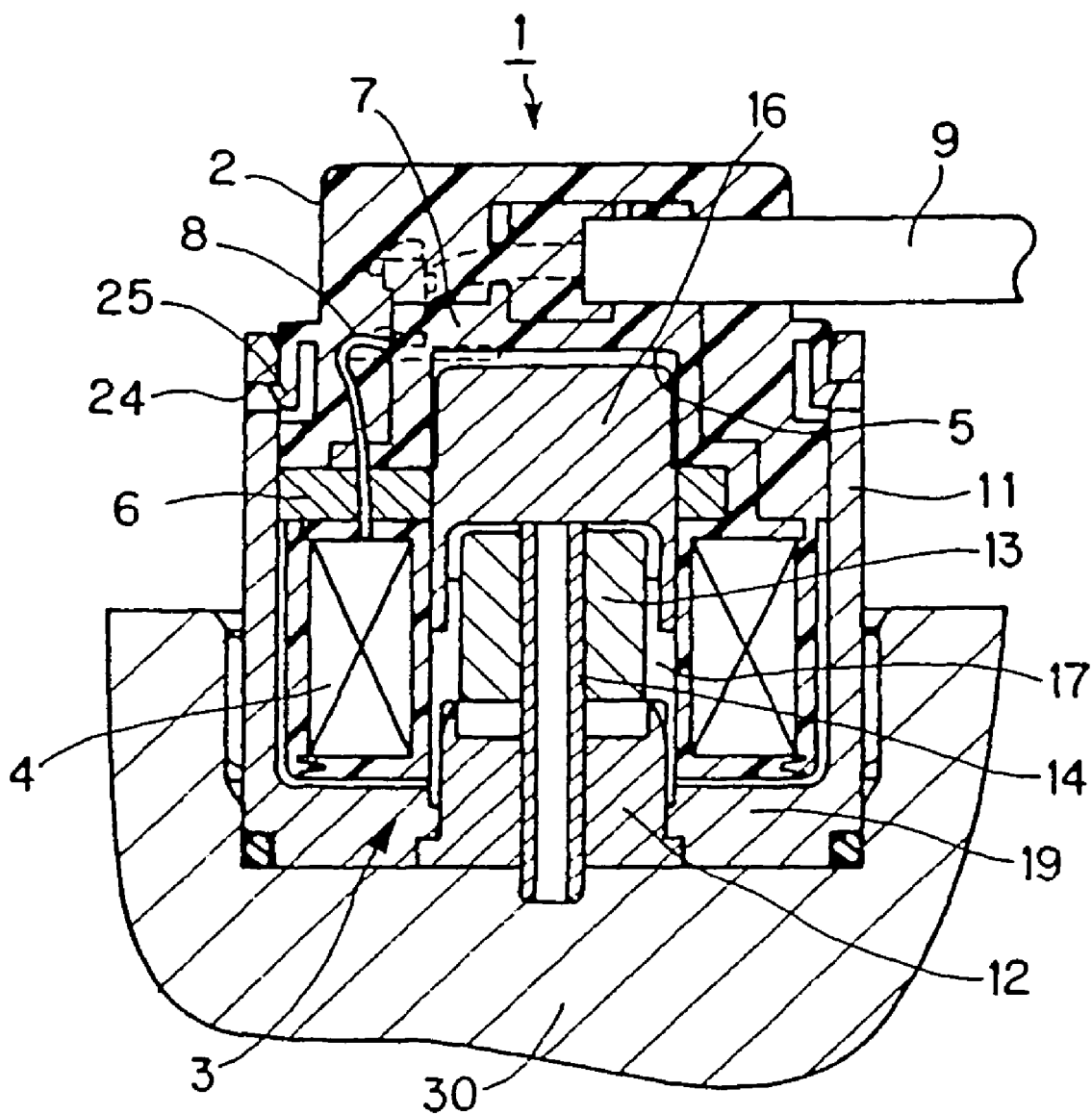
FIG. 9 is a schematic sectional view of a solenoid according to a sixth embodiment.

A solenoid according to a sixth embodiment of the present invention will be described with reference to FIG. 9. The components which are the same as those of the above-described embodiments are indicated by the same reference numerals and a description of such components will be omitted. As shown in FIG. 9, in this embodiment, the solenoid main body 3 is mounted to the associated apparatus 30.

In this embodiment, a recess 24 formed in the inner peripheral surface of the case 11 and a protrusion 25 formed in the outer periphery of the molded coil 2 are engaged with each other, whereby the molded coil 2 and the solenoid main body 3 are integrated into one. That is, the case 11 and the molded coil 2 are equipped with an engagement portion composed of the recess 24 and the protrusion 25.

The recess 24 is formed as a through-hole extending from the inner peripheral surface to the outer peripheral surface of the case 11.

The protrusion 25 has a resilient axial portion at its base. The outer diameter of the axial portion of the protrusion 25 and the inner diameter of the case 11 are substantially equal to each other.

In this solenoid 1, the molded coil 2 is put in the case 11 in the state in which the molded coil 2 and the solenoid main body 3 are separated from each other, and the protrusion 25 is locked the recess 24, making it possible to integrate the molded coil 2 and the solenoid main body 3 into one, thus facilitating the assembly and achieving an improvement in the assembling performance.

Further, in this embodiment, the recess 24 is in the form of a through-hole extending to the outer peripheral surface of the case 11, so that it is possible to push in the protrusion 25 from the outer peripheral surface of the case 11 even in the state in which the protrusion 25 is locked the recess 24, whereby it is possible to cancel the engagement of the recess 24 and the protrusion 25, making it possible to easily separate the molded coil 2 and the solenoid main body 3 from each other again. Accordingly, an improvement in terms of maintainability can be attained.

(Seventh Embodiment)

Figure 10:
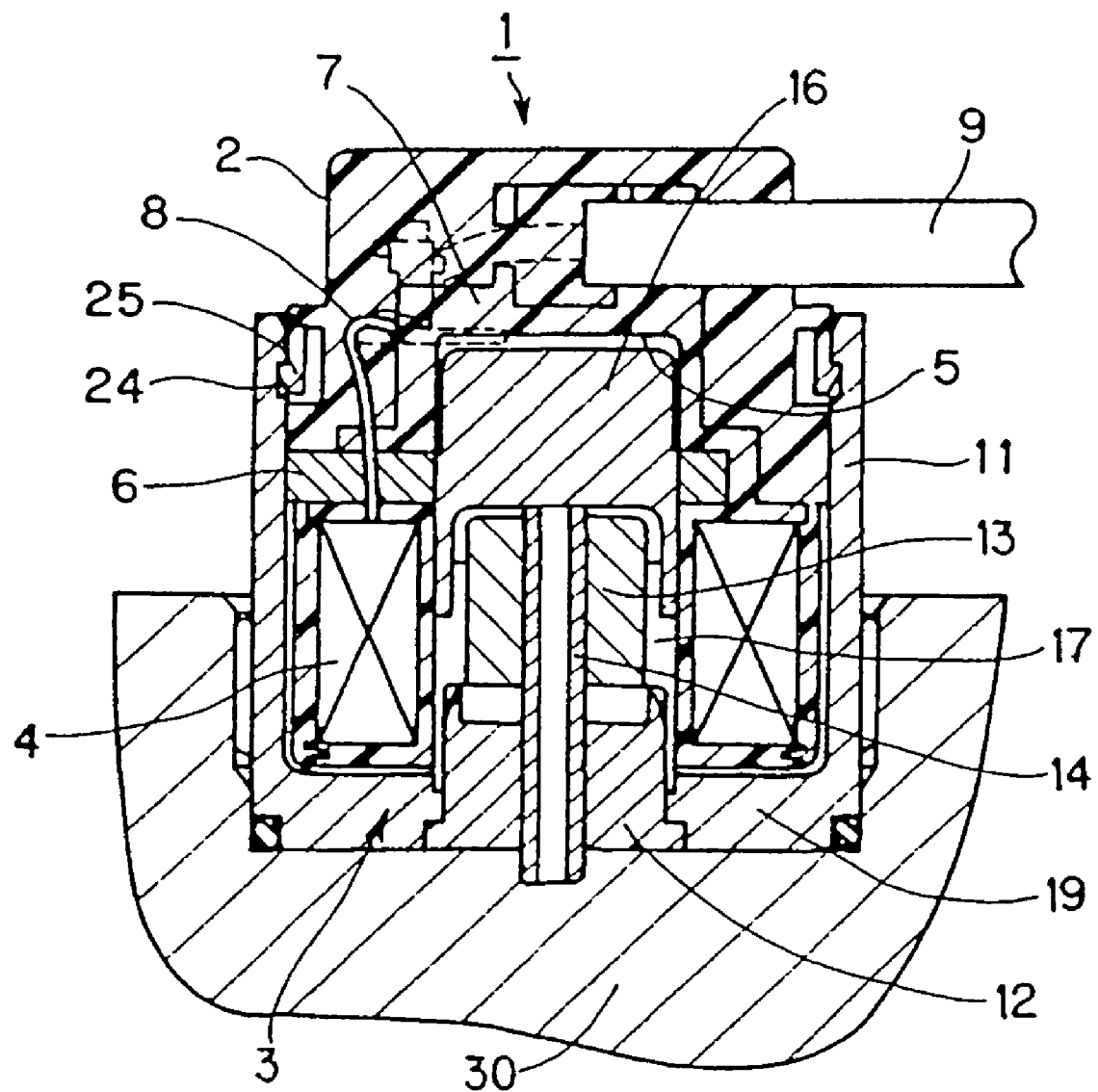
FIG. 10 is a schematic sectional view of a solenoid according to a seventh embodiment.

A solenoid according to a seventh embodiment of the present invention will be described with reference to FIG. 10. The components which are the same as those of the above-described embodiments are indicated by the same reference numerals and a description of such components will be omitted. As shown in FIG. 10, in this embodiment, the solenoid main body 3 is mounted to the associated apparatus 30.

As in the sixth embodiment, in this embodiment, there is provided the engagement portion composed of the recess 24 and the protrusion 25.

The recess 24 is formed by outwardly hollowing the inner peripheral surface of the case 11.

Further, the protrusion 25 has a resilient axial portion at its base. The outer diameter of the axial portion of the protrusion 25 and the inner diameter of the case 11 are substantially equal to each other.

In this solenoid 1, the molded coil 2 is put in the case 11 in the state in which the molded coil 2 and the solenoid main body 3 are separated from each other, and the protrusion 25 is locked the recess 24, making it possible to integrate the molded coil 2 and the solenoid main body 3 into one, thus facilitating the assembly and achieving an improvement in the assembling performance.

In this embodiment, the recess 24 is not formed so as to extend to the outer peripheral surface of the case 11, so that, in the state in which the protrusion 25 is locked the recess 24, it is impossible to cancel the engagement of the recess 24 and the protrusion 25, thereby achieving an improvement in terms of safety.

(Eighth Embodiment)

Figure 11:
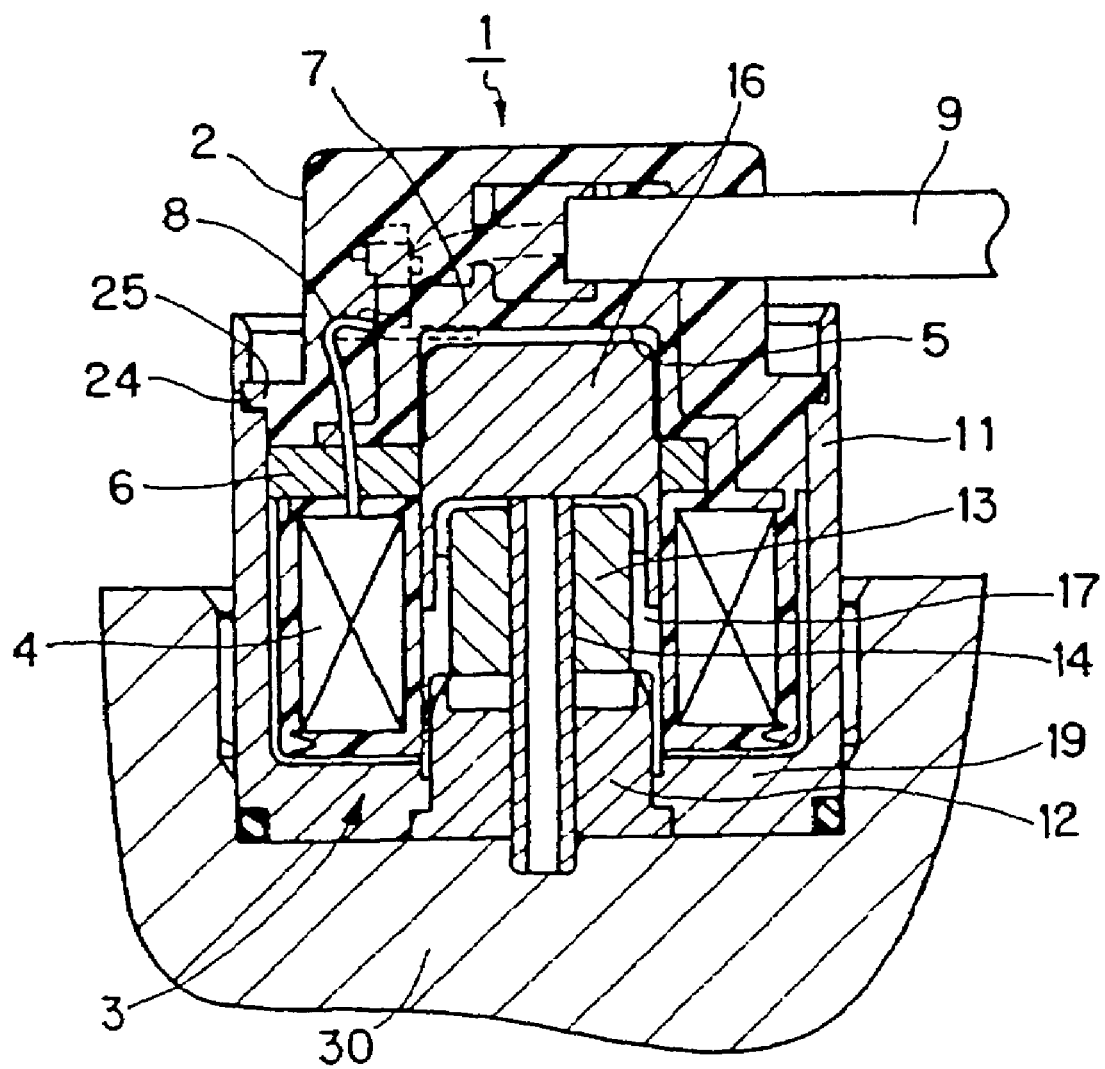
FIG. 11 is a schematic sectional view of a solenoid according to an eighth embodiment.

A solenoid according to an eighth embodiment of the present invention will be described with reference to FIG. 11. The components which are the same as those of the above-described embodiments are indicated by the same reference numerals and a description of such components will be omitted. As shown in FIG. 11, in this embodiment, the solenoid main body 3 is mounted to the associated apparatus 30.

As in the sixth and seventh embodiments, in this embodiment, there is provided the engagement portion composed of the recess 24 and the protrusion 25.

The recess 24 is formed by outwardly hollowing the inner peripheral surface of the case 11. Then, by thus reducing the wall thickness of the portion of the case 11 which the outside of the recess 24, resiliency is imparted thereto.

The protrusion 25 protrudes from a step portion in the outer periphery of the molded coil 2.

In this solenoid 1, the molded coil 2 is put in the case 11 in the state in which the molded coil 2 and the solenoid main body 3 are separated from each other, and the protrusion 25 is locked the recess 24, making it possible to integrate the molded coil 2 and the solenoid main body 3 into one, thus facilitating the assembly and achieving an improvement in terms of the assembling performance.

Further, in this embodiment, there is a gap between the outer side of the protrusion 25 and the inner peripheral surface of the case 11, so that, even in the state in which the protrusion 25 is locked the recess 24, it is possible to spread out the end portion of the case 11 to thereby cancel the engagement of the recess 24 and the protrusion 25, and the molded coil 2 and the solenoid main body 3, which have been integrated into one, can be again separated from each other easily, thereby achieving an improvement in terms of maintainability.

(Ninth Embodiment)

Figure 12:
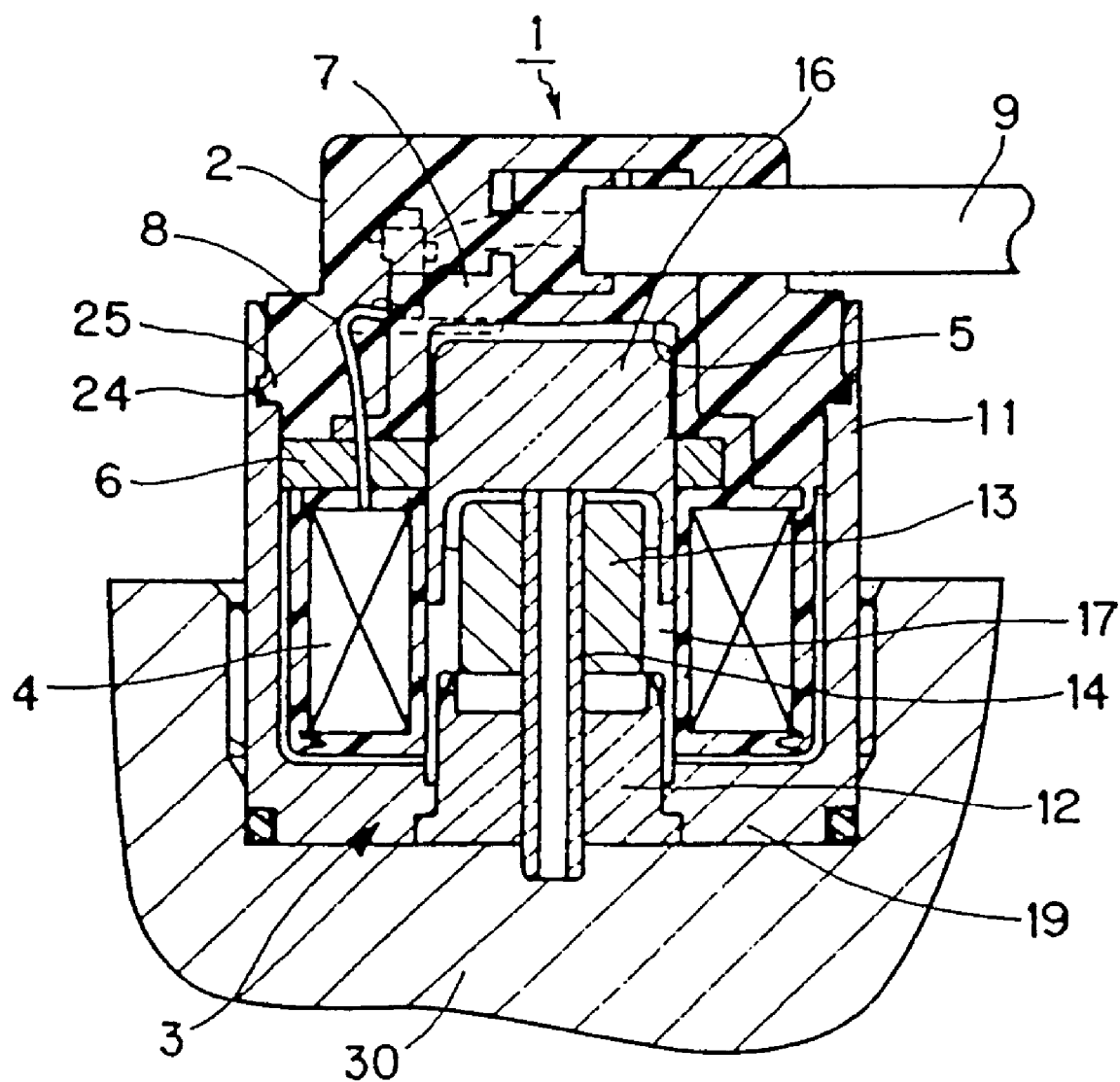
FIG. 12 is a schematic sectional view of a solenoid according to a ninth embodiment.
Figure 13:
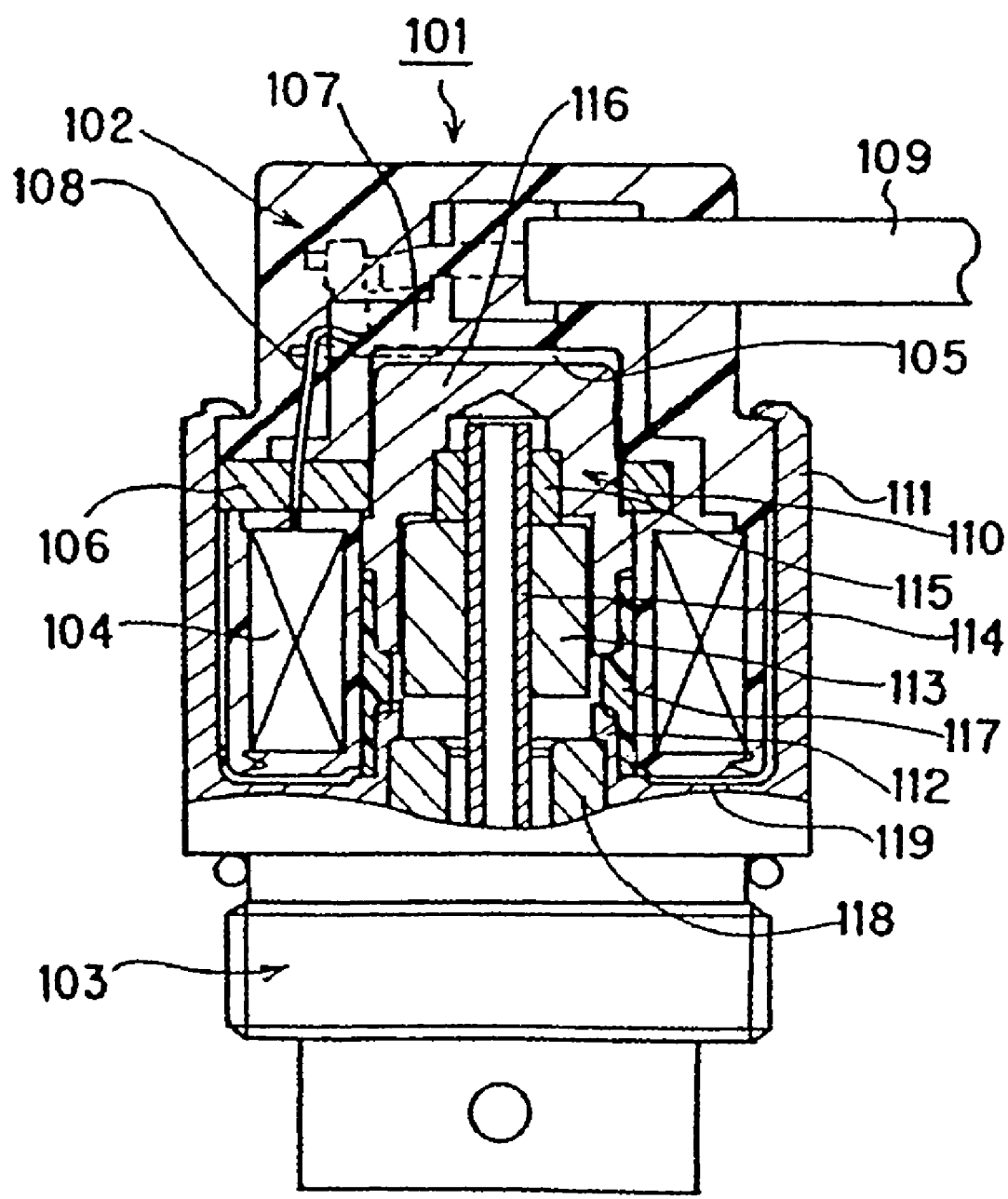
FIG. 13 is a schematic sectional view of a conventional solenoid.

A solenoid according to a ninth embodiment of the present invention will be described with reference to FIG. 12. The components which are the same as those of the above-described embodiments are indicated by the same reference numerals and a description of such components will be omitted. As shown in FIG. 12, in this embodiment, the solenoid main body 3 is mounted to the associated apparatus 30.

As in the sixth to eighth embodiments, in this embodiment, there is provided the engagement portion composed of the recess 24 and the protrusion 25.

The recess 24 is formed by outwardly hollowing the inner peripheral surface of the case 11. And, by thus reducing the wall thickness of the portion of the case 11 where the outside of the recess 24, resiliency is imparted thereto.

Further, the protrusion 25 protrudes from a midpoint of the outer peripheral surface of the molded coil 2. And, the outer diameter of the molded coil 2 and the inner diameter of the case 11 are substantially the same.

In this solenoid 1, the molded coil 2 is put in the case 11 in the state in which the molded coil 2 and the solenoid main body 3 are separated from each other, and the protrusion 25 is locked the recess 24, making it possible to integrate the molded coil 2 and the solenoid main body 3 into one, thus facilitating the assembly and achieving an improvement in the assembling performance.

Further, in this embodiment, in which the outer diameter of the molded coil 2 and the inner diameter of the case 11 are substantially the same, there is no gap between these components, so that it is impossible to spread out the end portion of the case 11 in the state in which the protrusion 25 is locked the recess 24, which means, in this state, it is impossible to cancel the engagement of the recess 24 and the protrusion 25, thereby achieving an improvement in terms of safety.

Note that, while in the sixth through ninth embodiments the recess 24 is formed in the case 11 and the protrusion 25 is provided on the molded coil 2, it is also possible to provide the recess 24 in the molded coil 2 and form the protrusion 25 on the case 11.

INDUSTRIAL APPLICABILITY

As has been described above, in accordance with the present invention, it is possible to finally integrate the molded coil and the solenoid main body with each other after various operation processes; by finally attaching the molded coil, the lead wire extending from the molded coil constitutes no obstacle, and the assembly is facilitated, thus achieving an improvement in terms of operability.

The invention claimed is:

1. A solenoid comprising:
a molded coil composed of a coil of a plural number of turns having a hole at its center; and
a solenoid main body having a case covering the outer periphery of the molded coil, a movable plunger inserted into the hole at the center of the molded coil, and a center post arranged in a direction in which the plunger is moved and attracted by a magnetic force generated by the coil,
wherein there is provided a snap ring for integrating the molded coil and the solenoid main body into one,
wherein the snap ring is mounted between a groove formed in an outer peripheral surface of the molded coil and a groove formed in an inner peripheral surface of the case, wherein an outer diameter of the molded coil as measured at least on the outer side of a position where the snap ring is mounted is substantially the same as an inner diameter of the case, wherein a peripheral section of the bottom of a groove formed in the outer peripheral surface of the molded coil and around which the snap ring is wrapped is noncircular, and wherein a wall portion is provided which protrudes from the bottom of the groove formed in the outer peripheral surface of the molded coil and around which the snap ring is wrapped and which constitutes a stopping between end portions of the snap ring.

2. A solenoid comprising:

a molded coil composed of a coil of a plural number of turns having a hole at its center; and a solenoid main body having a case covering the outer periphery of the molded coil, a movable plunger inserted into the hole at the center of the molded coil, and a center post arranged in a direction in which the plunger is moved and attracted by a magnetic force generated by the coil, wherein there is provided a snap ring for integrating the molded coil and the solenoid main body into one, wherein the snap ring is mounted between a groove formed in an outer peripheral surface of the molded coil and a groove formed in an inner peripheral surface of the case, wherein an outer diameter of the molded coil as measured at least on the outer side of a position where the snap ring is mounted is substantially the same as an inner diameter of the case, wherein a peripheral section of the bottom of a groove formed in the outer peripheral surface of the molded coil and around which the snap ring is wrapped is noncircular, and wherein a protrusion is provided which is spaced apart from the bottom of the groove formed in the outer peripheral surface of the molded coil and around which the snap ring is wrapped and which is situated on the outer side of a portion between the end portions of the snap ring.

* * * * *

UNITED STATES PATENT AND TRADEMARK OFFICE
CERTIFICATE OF CORRECTION

PATENT NO. : 7,123,120 B2
APPLICATION NO. : 10/473137
DATED : October 17, 2006
INVENTOR(S) : Watanabe et al.

It is certified that error appears in the above-identified patent and that said Letters Patent is hereby corrected as shown below:

On Title Page, Item (73) Assignee, please change "Nok" to --NOK--.

Signed and Sealed this

Third Day of April, 2007

JON W. DUDAS
*Director of the United States Patent and Trademark Office*